(12) United States Patent
Rodriguez Navio (10) Patent No.: US 6,695,566 B2
(45) Date of Patent: Feb. 24, 2004

(54) MULTIPURPOSE ALL-TERRAIN VEHICLE LAUNCHABLE BY PARACHUTE

(75) Inventor: Carlos Javier Rodriguez Navio, Alcala De Henares (ES)

(73) Assignee: Equipos Industriales de Manutencion S.A. (EINSA) (ES)

( * ) Notice: Subject to any disclaimer, the term of this patent is extended or adjusted under 35 U.S.C. 154(b) by 0 days.

(21) Appl. No.: 09/910,277

(22) Filed: Jul. 19, 2001

(65) Prior Publication Data

US 2002/0018707 A1 Feb. 14, 2002

(30) Foreign Application Priority Data

Jul. 21, 2000 (ES) .......................................... 200001822

(51) Int. Cl.[7] .............................................. A62C 27/00
(52) U.S. Cl. ......................................... 414/538; 180/22
(58) Field of Search ................................ 414/538, 353, 414/523; 180/22, 24

(56) References Cited

U.S. PATENT DOCUMENTS

| | | | | |
|---|---|---|---|---|
| 1,639,879 A | * | 8/1927 | Buffington | 296/57.1 |
| 3,776,498 A | * | 12/1973 | Peters et al. | 248/221 |
| 3,942,670 A | * | 3/1976 | Mingus et al. | 220/23.4 |
| 4,089,399 A | * | 5/1978 | Webb | 193/35 SS |
| 4,821,825 A | * | 4/1989 | Somerton-Rayner | 180/22 |
| 4,966,244 A | * | 10/1990 | Somerton-Rayner | 180/24.09 |
| 5,259,524 A | * | 11/1993 | Eckert | 220/23.4 |
| 5,445,487 A | * | 8/1995 | Koscinski, Jr. | 414/543 |
| 5,769,449 A | * | 6/1998 | Keesee | 280/656 |
| 6,029,750 A | * | 2/2000 | Carrier | 169/15 |

* cited by examiner

Primary Examiner—James W. Keenan
Assistant Examiner—Charles A. Fox
(74) Attorney, Agent, or Firm—Baker Botts LLP (57) ABSTRACT

The vehicle is provided with a loading platform (5) behind the driver's position, and with longitudinal structures which may be raised and retracted, on which are provided a number of rollers (8) with horizontal, parallel shafts which are transverse to the vehicle, on which loads may slide when these rollers are raised. It is also provided with a pair of multi-purpose plates (11), which when not needed are placed in the rear, lower area of the vehicle or behind the roll bar, and which may be coupled to either of the vehicle's sides or to its rear, so that they rest on the ground and provide loading and unloading ramps, while when they are placed on top of the platform they can increase its useful surface, or a lateral wall, depending on the position of these plates. In the center of the loading platform is also provided a large receptacle (16), closed by a pair of doors which have padding (27) on their inner surface, thereby providing seats for when persons must be carried.

11 Claims, 6 Drawing Sheets

MULTIPURPOSE ALL-TERRAIN VEHICLE LAUNCHABLE BY PARACHUTE

CROSS REFERENCE TO RELATED APPLICATIONS

This application claims priority to Spanish Patent Application No. 200001822 filed Jul. 21, 2000.

OBJECT OF THE INVENTION

The present invention relates to an all-terrain vehicle, such as those popularly known as "mules", which despite their small size have a large load capability and are operational in all terrains.

The object of the invention are a number of improvements which increase its versatility and improve its performance.

BACKGROUND OF THE INVENTION

All-terrain vehicles commonly known as "mules" have a sturdy, compact chassis which rests on four wheels, all of which are driven, and have a small loading platform which, despite its small size, can carry large loads, on the order of 400 to 800 Kgs.

In these type of vehicles all-terrain operativity usually prevails over speed, so that they are usually quite slow and often have top speeds between 5 and 40 Km/h. For this same reason they are generally sturdy, simple vehicles, with minimal comfort for the driver, often lacking a cab, power steering, windshield wipers, heating, etc., justifying their popular name of "mules". In fact, their origin lies in providing a mechanical substitute for these animals in handling and transporting large loads in environments where ordinary all-terrain vehicles cannot operate.

DESCRIPTION OF THE INVENTION

The all-terrain vehicle of the invention substantially improves the operational characteristics of current vehicles, as well as providing a number of additional advantages which will be described throughout the description.

For this purpose, based on the general basic structure of this type of vehicle as regards chassis, engine, suspension, traction and steering, one of the main characteristics of the vehicle disclosed is that it incorporates on its loading platform several longitudinally aligned rollers, which are mounted on corresponding supports which when set on said platform can occupy two extreme positions. In the first of these positions the rollers do not project beyond the loading platform, so that this surface is flat and practically horizontal. In the second, the structure that contains the rollers can be raised with them, thereby raising the load which may be on the platform. Thus, as the load rests on the rollers of the two or more rows it can move longitudinally to be correctly positioned on the plate, or for unloading.

The vehicle is provided on the rear generator line of the load plate with strong points on which hinges connected to a flat structure may be joined. This flat structure is generally flat, rectangular and similar in width to the loading platform. This extra hinged surface provides the following additional functions:

a) When it is in a horizontal position the loading surface of the vehicle is increased.

b) When it is vertical and facing downwards it provides the vehicle with a 90° outlet angle. If there is no need for the vehicle to have an outlet angle of 90° this additional hinged loading surface can be fixed in place, and incorporated into the loading platform of the vehicle. If a greater loading surface is required this additional structure can be removed, so that its extra weight may be replaced by additional useful load.

This complement is secured in its working position, as a complement of the loading platform (horizontal position) and in its resting position (vertical downwards) by suitable attachment elements, as described further below.

In accordance with a further characteristic of the invention, the mid area of the loading platform is provided, between the aligned rollers described above, with a two-leaf door with both leafs padded on the bottom surface and able to rotate 180° about two-shaft hinges. These doors open outwards and may occupy two stable positions, namely:

a) Closed position: In this position the doors are a continuation of the loading platform and have a specific load strength which is identical to that of the loading platform;

b) Open position: The object of this position is to allow transportation of passengers. In this position the doors are rotated 180° with respect to the previous position, and rest entirely on the fixed part of the platform. Its padded surface faces upwards, revealing a central receptacle for the passengers' legs.

The vehicle is provided with two elongated plates, generally made from a lightweight material so that it is easier to handle, designed such that:

a) One end of its short side is bevelled b) The end opposite the bevelling of the short side has two hooks with a special design, which will be described later c) One side wall of the wide side has two hooks such as those of the previous paragraph.

These plates have several functions:

a) The rear area of the loading platform is provided with forks onto which the hooks of b) above can couple perfectly, thereby forming a safety buckle. With the plates in this position and allowing their bevelled end to rest on the floor, ramps are provided between the loading platform and the floor, which fulfil two functions:

1. They allow to pile one vehicle on top of another.

2. Together with the above described retractable rollers, they allow loading and unloading between the loading surface and a flat bed pallet. Loading is performed with the aid of a winch which may be placed on the loading platform behind the driver's position. Unloading is performed simply by pushing the load manually, so that it slides on the rollers. Thus, a single person can handle loads of one ton easily.

b) Each sidewall of the loading platform has forks which are similar to those on its rear and which couple perfectly onto the hooks described in point c) above. The plates can lock onto these forks in two positions:

1st position: The plate is stable and horizontal, forming a continuation of the loading platform with a similar specific load capacity.

2nd position: The plate is vertical, thereby forming sidewalls for the loading platform. These can be very useful when transporting loose loads, in which case the system is completed by straps attached to one of the sides of the vehicle's roll bar which lock onto the plates on their outside and continue as far as the other side of the roll bar. These straps are normally provided with a tension device. We thus have a fully closed loading surface, with a plate on each side, two straps on the rear and the structure of the roll bar on the front.

c) The plates can further be helpful in particularly demanding traction conditions, such as viscous mud, loose sand, etc.

When loose loads are carried and it is known in advance that the plates will not be required for other purposes, the plates may be replaced by four struts designed such that they insert in corresponding orifices made in the edges of the loading platform, so that they remain vertical, thus forming sidewalls. These struts have handles through which may pass strong straps which are attached to one side of the roll bar, and which then pass though the handles of the four struts, to be finally attached to the other side of the roll bar. Thus, an enclosure is obtained with two straps on each side of the loading platform and on its rear, with the front area closed by the roll bar.

The vehicle is designed so that it may have a winch attached in six different positions, depending on the various electrical power connections so that the winch may be powered more easily in each operational position. These positions are:

Centred on the loading platform and held between this platform and the roll bar. This is to allow loading from the ground at a controlled speed, with the aid of the aforementioned plates.

One on each side of the vehicle, i.e. forward, rear, left and right. This flexibility in the position of the winch greatly simplifies mobility in difficult terrain, increasing safety in the manoeuvre. It also increases capacity for recovering other vehicles.

Transportation position.

The vehicle's kinematic chain can be adapted to various uses, so that its top speed can be set between 45 and 90 km/h and its maximum tractive force at the wheel can be between 1600 daN and 3200 daN.

To improve its all-terrain performance the vehicle has axle differentials which are 100% lockable by a pneumatic automatic device. This operation can be performed with the vehicle in motion.

Naturally, the locking sequence must be as follows:
1. Locking the rear differential.
2. Once the rear differential is locked the front differential can be locked (if operational conditions suggest that it is not sufficient to lock the rear differential, and maintaining the forward differential locked only for the time required to overcome the difficulty).

In order to unlock the differential the inverse process must be followed, that is:
1. Unlock the forward differential (if it is locked).
2. Unlock the rear differential.

The compressor used to lock/unlock the differentials is also used to inflate the tires.

The vehicle also allow the central differential to be free, self-locking or limited sliding.

The vehicle is designed such that it has attack and outlet angles of 90° and a between-axle central clearance of 400 to 440 mm.

The vehicle has long-run suspensions in order to allow the wheels to remain in contact with the ground in a maximum of conditions, which together with the aforementioned possibility of locking the differentials provides outstanding all-terrain performance.

The vehicle is provided with a tow hitch on the rear and is designed to tow loads.

The vehicle is also provided with hooks on the entire periphery of the loading platform, in order to hold down the load whatever its configuration. It also has additional hooks for raising it with slings.

The vehicle may have no cab, or have a simple windshield and a tarp, or may have a fully closed cab.

Finally, and according to a further characteristic of the invention, the vehicle steering wheel is removable, and the roll bar and seat can be folded forwards. Thereby a position is obtained in which they are barely above the general plane of the loading platform of the vehicle, which allows a simple piling of two vehicles in order to minimise the space occupied by them during storage, transportation of airlifting.

One possible use of the vehicle is to aid in the distribution of goods of international aid given by some countries to others in specific situations of need. A convenient condition for this use is its possibility of airlifting, parachute launching and wading. Therefore, the vehicle is designed to operate in these conditions, with the following characteristics:

For airlifting:
The chassis and all of its components withstand the following dynamic loads:
Forward 3.0 g.
Rearward 1.5 g.
Lateral 1.5 g.
Vertical 2.0 g.

For launching:
1. Withstand dynamic loads which occur during extraction of the equipment from the airplane, on the corresponding pallet.
2. Withstand after extraction the first pendulum action, with an amplitude of nearly 270° from the horizontal, so that during part of this oscillation the vehicle will be inverted, with the wheels facing upwards.
3. The entire structure and components are designed to withstand ground impact, which is equivalent to a free drop from a height of 3.5 meters.

For wading:
The vehicle is designed to wade in up to 70 cm. depths without any special preparation, with all water-sensitive components placed above this level.

DESCRIPTION OF THE DRAWINGS

The characteristics of the invention will be better understood in view of the accompanying drawings of a preferred embodiment of the invention, where for purposes of illustration only the following is shown.

PREFERRED EMBODIMENT OF THE INVENTION

In view of these figures it can be seen that the vehicle disclosed consists of a chassis (1), with a suitable strength, with four driving wheels (2), an open driver position with one or two seats (3), protected by a roll bar (4), and a loading platform (5).

Figure 6:
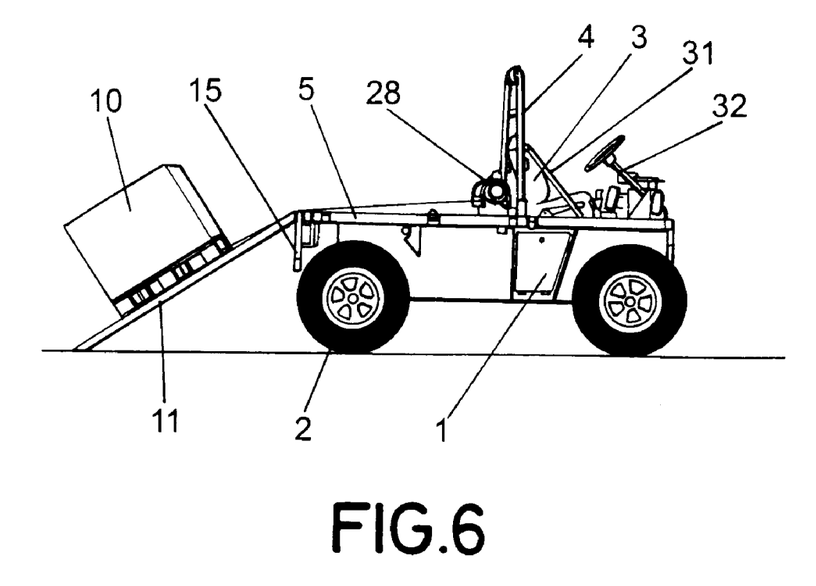
FIG. 6 shows a lateral elevation view of the vehicle as it is raising a palletised load on its rear and with the aid of the aforementioned ramps.

Based on this conventional structure, the vehicle of the invention incorporates on its loading platform (5) a pair of longitudinal grooves (6) in which are housed the corresponding longitudinal supports (7), on which rollers (8) are placed. These supports (7) are mounted on the longitudinal grooves (6) through small connecting rods (9) which may be driven by any mechanic or hydraulic means, and which make the rollers (8) pass from the resting position shown in the figures (in which the rollers do not project out of the loading surface) to an elevated position. In this position the rollers emerge from this loading platform (5) to form a roller base for heavy loads with a flat base, such as the palletised load (10) of FIG. 6, simplifying the displacement of this load.

In order to lift these loads (10) from the ground the vehicle is provided with a pair of elongated plates (11), which as described below have multiple purposes. These plates have a length such that a proper slope can be provided between the loading platform (5) and the ground. They are provided on one end with a pair of hooks (12) through which they may be coupled to any of the three free edges of the loading platform, with the aid of forks (13) which in the form of shafts are operationally provided in recesses (14) made in these edges of the platform.

Figure 1:
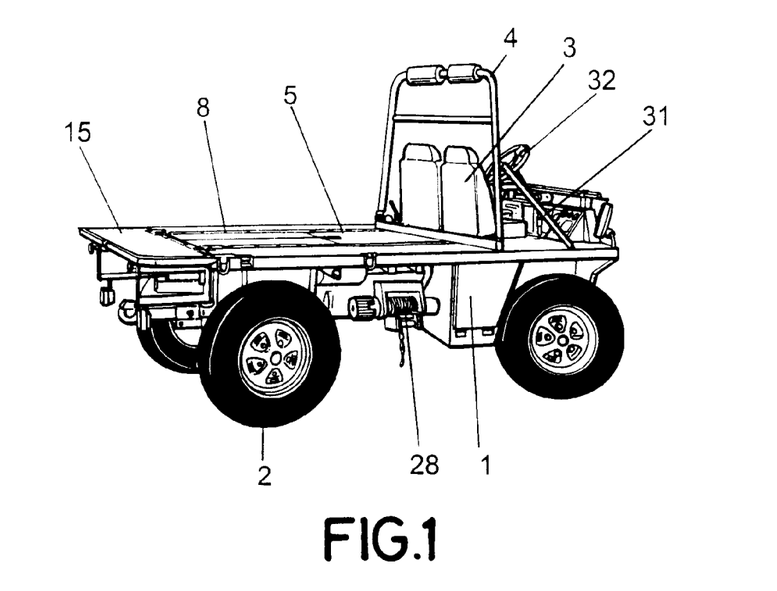
FIG. 1 shows a side perspective view of a multipurpose all-terrain vehicle in accordance with the object of the present invention.
Figure 2:
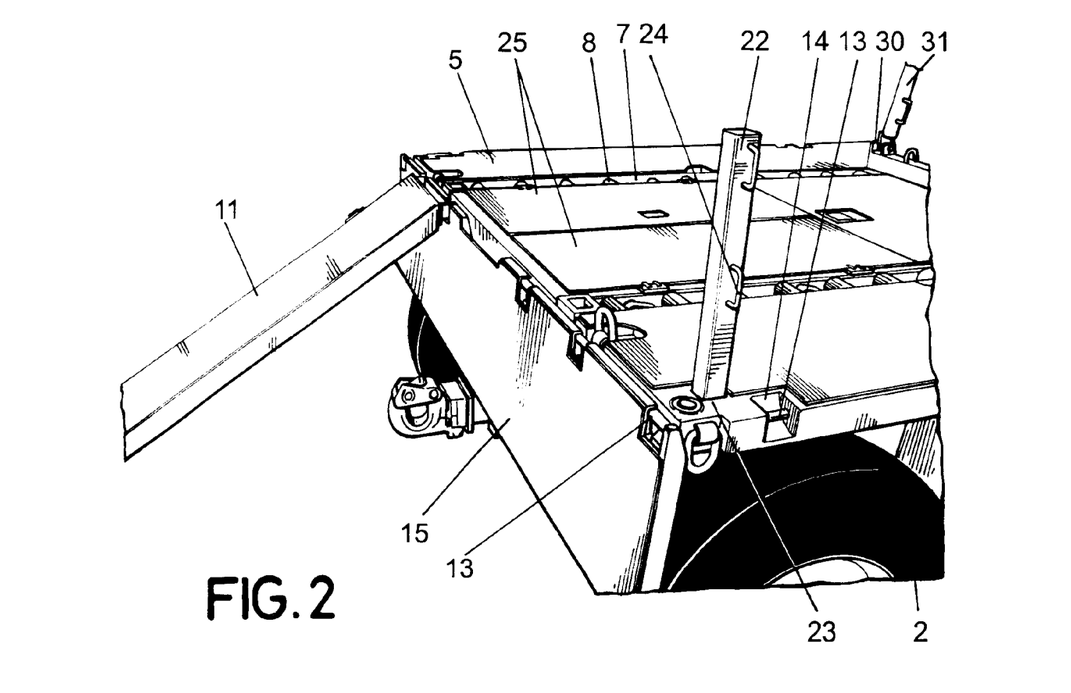
FIG. 2 shows a perspective enlarged view of the rear of the vehicle, with one of the ramps coupled in its working position.
Figure 3:
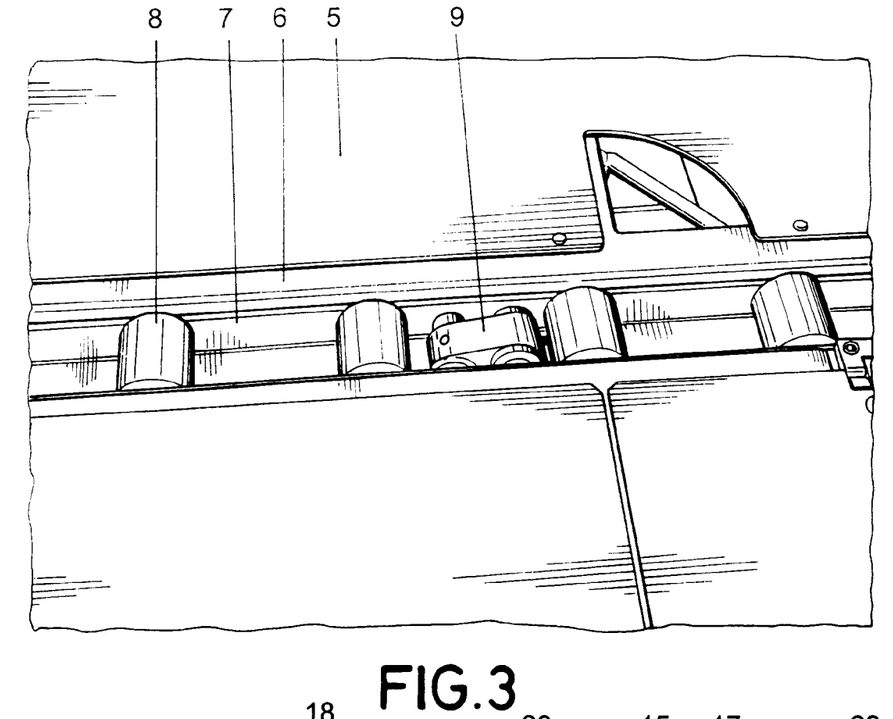
FIG. 3 shows an enlarged perspective view of one of the rows of rollers placed on the loading platform.

Some of the forks (13) corresponding to the rear edge of the platform (5) can be used as an articulation joint for an optional, strong rear plate (15) which can be folded. This plate can adopt the resting position of FIG. 2, required to couple plates (11) to the rear edge of the platform, or a horizontal position such as that shown in FIG. 1. In this latter position the useful loading surface of platform (5) is increased.

Figure 4:
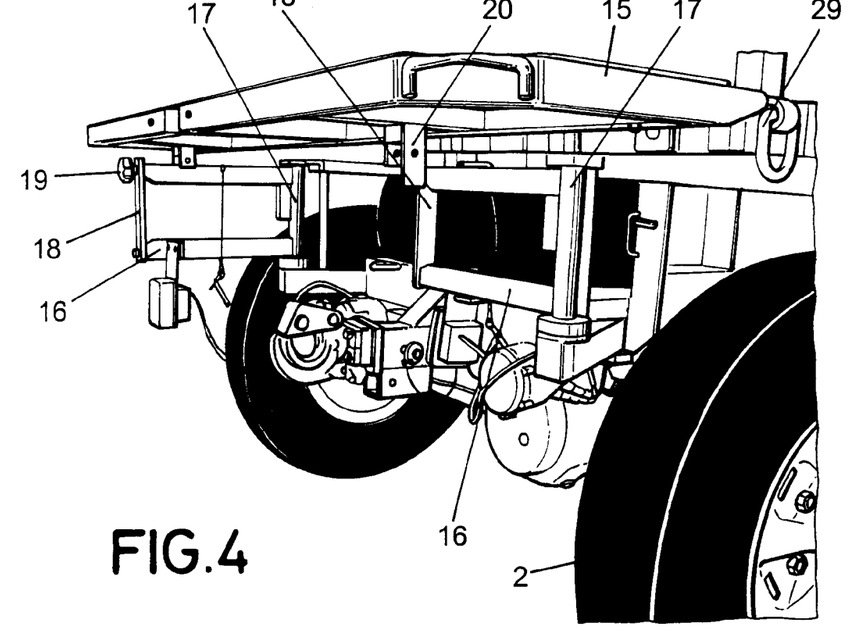
FIG. 4 shows an enlarged perspective view of the rear of the vehicle, showing the supports for the rear, retractable plate of the loading platform and the multi-purpose complementary ramps.
Figure 5:
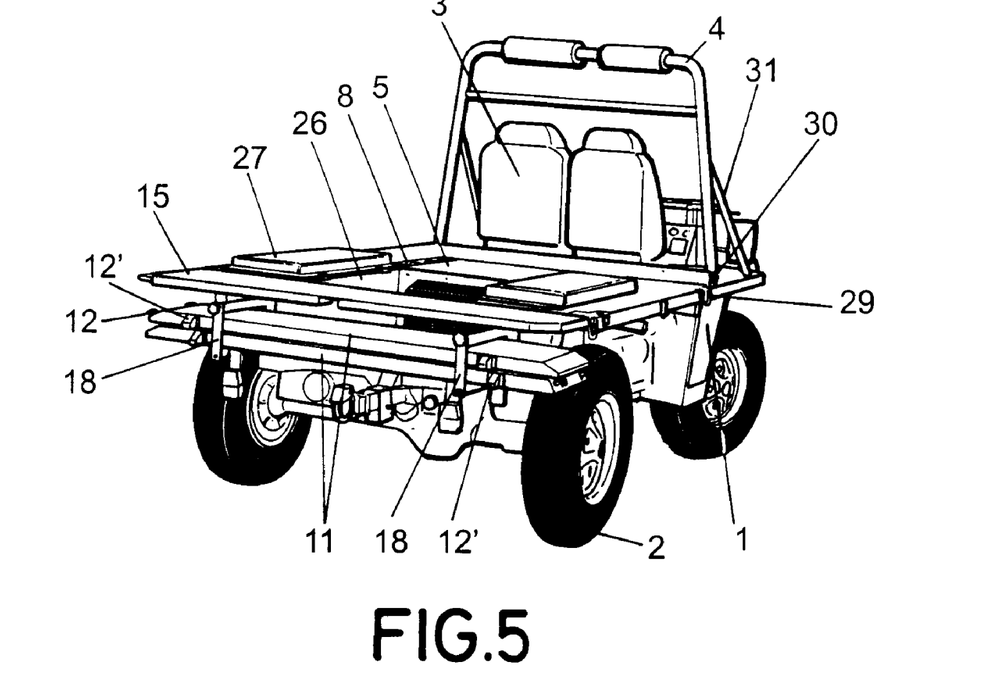
FIG. 5 shows a rear perspective view of the vehicle of the previous figures, in which the lids of the loading platform are open and form seats, while the complementary ramps are housed in the aforementioned rear supports.

The horizontal position of this plate (15) is kept stable by a pair of lower supports (16), particularly visible in FIG. 4, each of which is embodied as a rectangular frame which is jointed to the vehicle chassis on one of its vertical segments (17), that which is externally positioned in the resting position of said supports. These supports also provide a means of storage of plates (11) in their resting positions, as shown in FIG. 5. For this purpose the supports (16) may fold about their vertical upright (18) opposite the folding shaft (17), and may be closed with a bracket (19). They may also be attached to the rear plate (15) with forks (20) which are joined to said plate, and which act on the roll bar of supports (16), to which they are held with bolts or any other suitable means.

Figure 7:
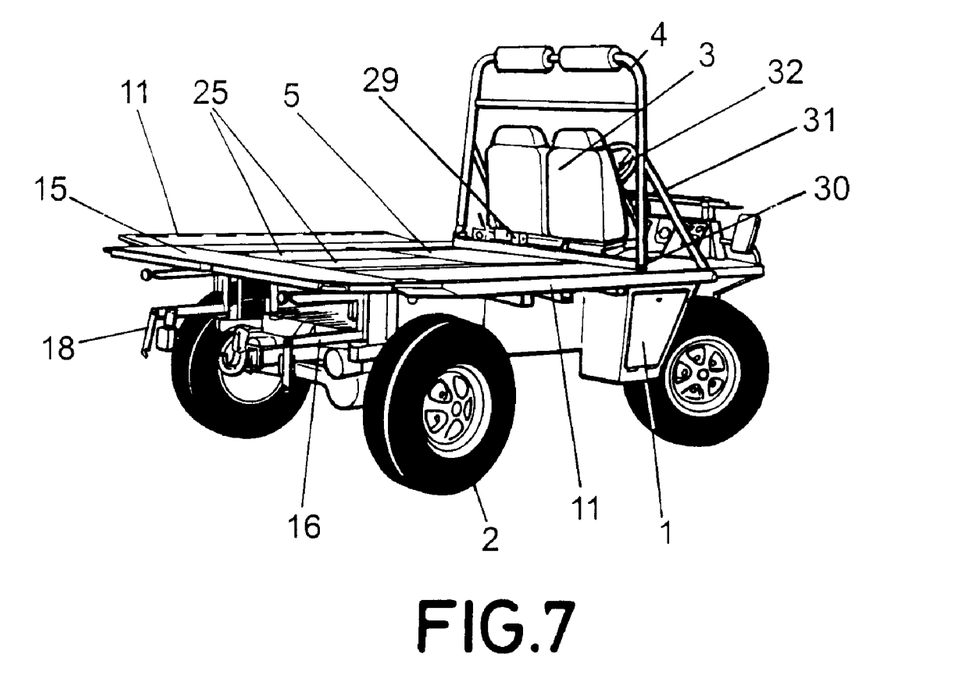
FIG. 7 shows another general perspective view of the vehicle in which the complementary ramps are conveniently attached to the loading platform in order to increase its useful surface.
Figure 8:
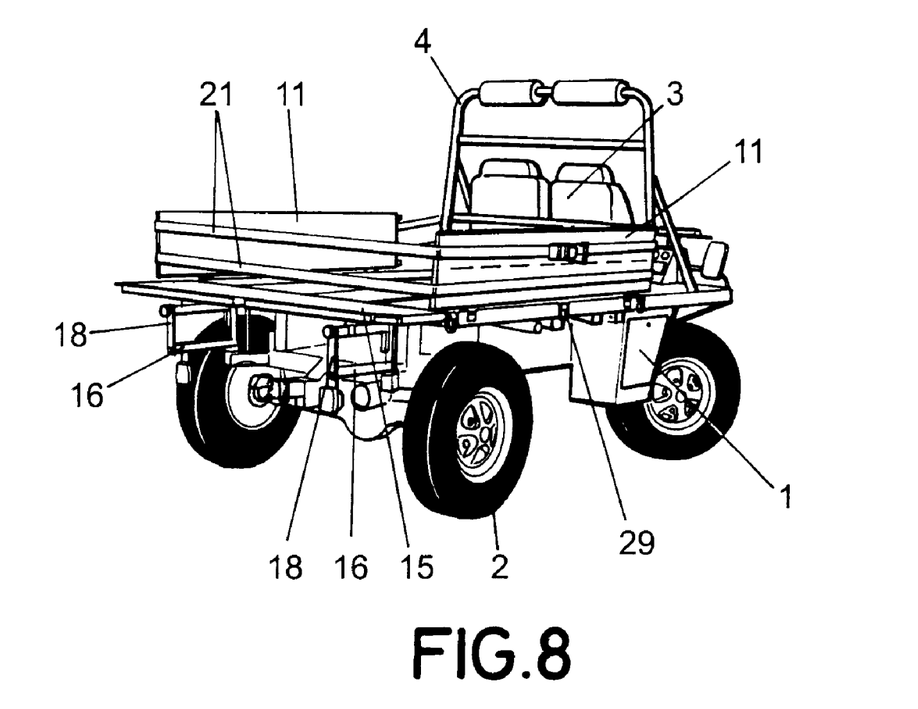
FIG. 8 shows a view similar to FIG. 7, in which the said ramps act as sidewalls of the loading platform, and are kept in this position by exterior straps.

Plates (11) are also provided with hooks (12') on one of their longitudinal edges, located such that they may latch onto any two sidewalls of the loading platform (5) and in any of the positions shown in FIGS. 7 and 8. In the first of these the position is coplanar to the platform (5) in order to increase its useful width, which position is stabilised by resting on the edges of the platform. In FIG. 8 the position is vertical, for which it is necessary to invert the position of the plates, rotating them 180° with respect to the previous position, adopting a stable configuration in an inwards sense but unstable towards the outside. This position must be stabilised by a pair of perimeter straps (21), which preferably will also embrace the roll bar (4) of the vehicle, as shown in FIG. 8.

Figure 9:
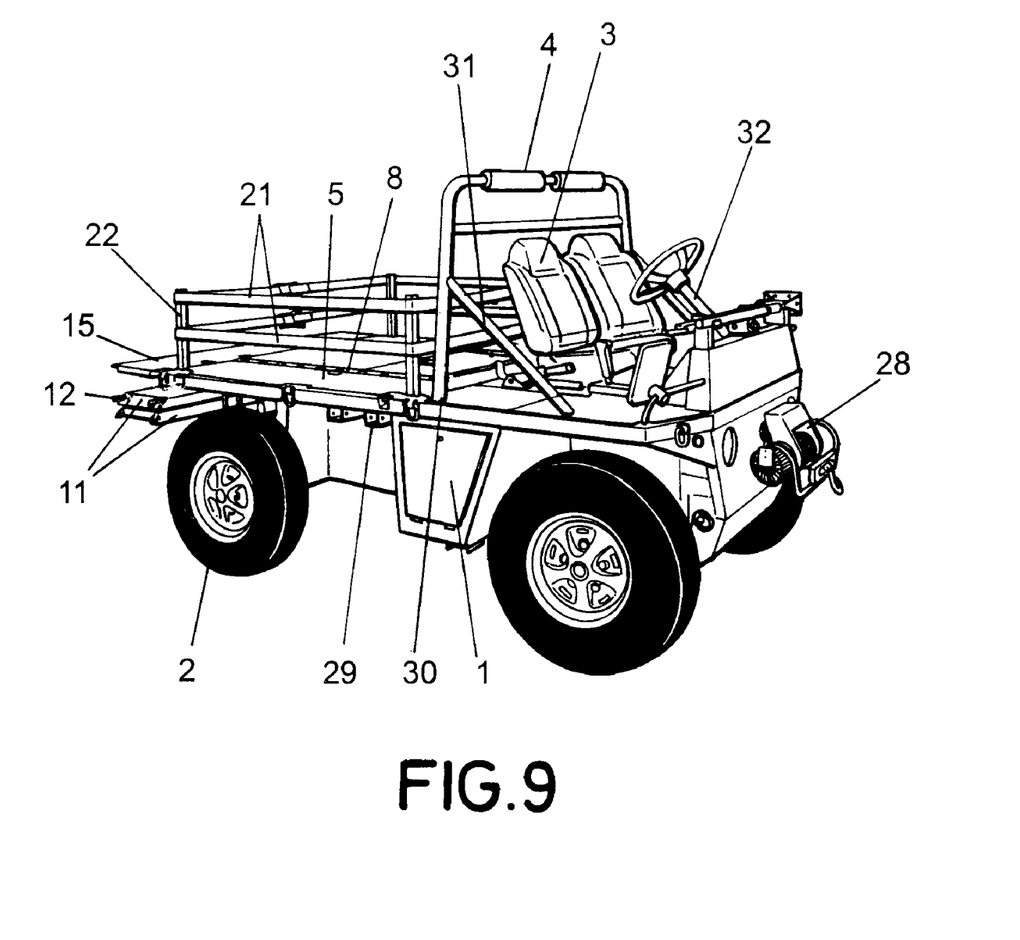
FIG. 9 shows finally, another perspective view of the vehicle in which the hold-down means of the loading platform consist only of the straps which in the previous figure held down the ramps, and of struts to which these straps are attached.

However, the loading platform can also be closed perimetrally only by straps (21), as shown in FIG. 9. In this case plates (11) are in the storage position in the lower rear area of the vehicle, and next to the corners of the loading platform (5) are inserted struts (22) in orifices (23) provided for such purpose. These struts (22) have half-rings (24) for passage and stabilisation of the straps (21).

Returning once again to the loading platform (5), a pair of doors (25) are provided between the two rows of rollers (8). In the closed position these doors (25) are part of the loading platform, as shown for example in FIGS. 1 and 2, but they may open 180° outwards towards the sides of the platform as shown in FIG. 5, thereby providing access to a receptacle (26) which is framed by these doors, and more specifically by a padding (27) placed on the inner face of the doors. This padding (27) will now be on the outside in this open situation, providing seats for passengers who can then be carried much more comfortably than in a traditional vehicle of this type as their legs are housed in the said receptacle (26) and they are seated on a padded surface.

Figure 10:
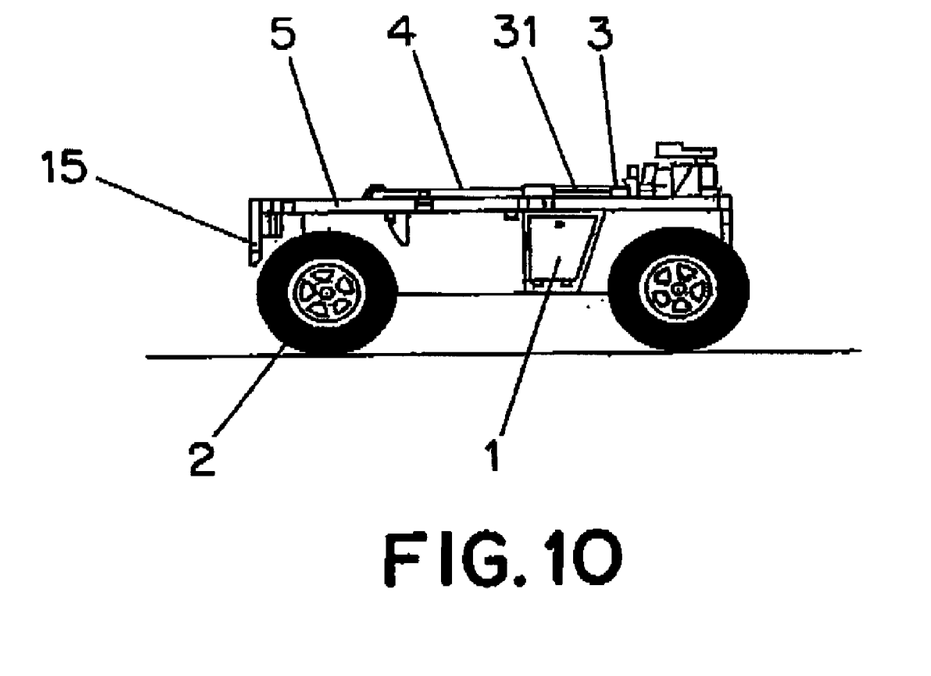
FIG. 10 shows the vehicle in a folded state for transport.

Returning once again to the mobilisation of loads (10), the vehicle is provided with a single winch (28) whose support is provided with two rods which may be inserted in various parts of the vehicle, as described before. As an example, it is shown in the conventional front end in FIG. 9, or on the loading surface as in FIG. 8, or on a side of the vehicle as in FIG. 1 when the winch is used to aid operation of the vehicle, or in the anterior marginal area of said loading platform as in FIG. 7. For this purpose it has tubular shaped housings (29) at each point of attachment, in which the support can be inserted and secured. In this way the single winch may be positioned in a position ideally suited to each task which it performs. As shown in FIG. 10, the platform 5 provides a surface to receive another vehicle piled on top.

Finally, and according to another characteristic of the invention, roll bar (4) is joined to the chassis (1) by joints (30). A pair of lateral tie rods (31) aid in this, which are also jointed to the bar and which can be attached by bolts or any other means to the chassis. Thus, the roll bar (4) and the vehicle seat or seats (3) can be folded forwards to a maximum retraction position, as the steering wheel (32) is removable such as by a bolting device or any other. In this folding position of the anterior elements of the vehicle, said vehicle is enabled to receive another piled on top of it, with the ensuing volume reduction during storage, distribution or transport of this type of vehicle. In the drawings the roll bar (4) determines a structure which may be complemented by a tarp cover or the like, defining an open type cab.

What is claimed is:

1. Multi-purpose all-terrain vehicle constructed to be air-lifted and dropped by parachute, said vehicle having a wheeled chassis incorporating an open driving position with a roll bar, and a loading platform, wherein the vehicle is capable of wading in up to 70 cm. depths, wherein in said loading platform are established two longitudinal rows of rollers mounted on corresponding supports, which are retractable and which fit in grooves of the platform, connected to said platform by connecting rods driven by any means allowing to partially raise the supports with the rollers with respect to a general plan of the loading platform, forming wheeled supports for large loads which have a flat base, and further wherein the chassis has a lower rear area which is provided with a pair of supports embodied as rectangular frames which may swivel sideways by means of shafts, so that the supports are means of support of a rear plate which is hinged to the rear edge of the platform and which forms an extension of said platform, the supports provide the means of support for plates when the plates are in a resting position, for which purpose the said supports have a segment opposite a swivel shaft which can be retracted and locked in position by the aid of a bracket, and the supports can be attached to the lower face of the rear plate when the latter is horizontal, using a fork associated to said plate.

2. Multi-purpose all-terrain vehicle launchable by parachute, according to claim 1, wherein the vehicle incorporates two elongated plates, which are independent and multi-functional, and which maybe used to lift heavy loads with the aid of a winch, and which may also be used to increase the useful surface of the loading platform and as side walls for said platform, for which purpose each of said plates is provided on one of its ends with a pair of hooks by which it can be perpendicularly coupled to any of three free edges of the platform with the aid of shaft-like forks provided in housings of the edges, wherein the plates comprise longitudinal edges and on one of the longitudinal edges the plates also incorporate hooks which allow to couple the plates longitudinally or parallel to side edges of the platform, in two inverted position, in one of which the plates tend towards a horizontal position co-planar to the platform because of gravity, and in the other of which they are perpendicular to the platform, which is stabilised with the aid of perimeter swaps which run between the two plates.

3. Multi-purpose all-terrain vehicle launchable by parachute, according to claim 2, wherein provided at strategically chosen points of the chassis and the loading platform are female housings or sockets for male supports of a winch, such that a single winch can be placed in up to six different locations on the vehicle, depending on the tasks it is used for.

4. Multi-purpose all-terrain vehicle launchable by parachute, according to claim 2, wherein the loading platform comprises vertices, wherein near the vertices of the loading platform are provided orifices in which can be inserted corresponding struts provided with half-rings for passage of straps, so that the straps establish by themselves a side enclosure of the loading platform, with the aid of the struts and the safety roll bar.

5. Multi-purpose all-terrain vehicle launchable by parachute, according to claim 1, wherein provided at strategically chosen points of the chassis and the loading platform are female housings or sockets for male supports of a winch, such that a single winch can be placed in up to six different locations on the vehicle, depending on the tasks it is used for.

6. Multi-purpose all-terrain vehicle launchable by parachute, according to claim 1, wherein the loading platform comprises vertices, wherein near the vertices of the loading platform are provided orifices in which can be inserted corresponding struts provided with half-rings for passage of straps, so that the straps establish by themselves a side enclosure of the loading platform, with the aid of the struts and the safety roll bar.

7. Multi-purpose all-terrain vehicle constructed to be air-lifted and dropped by parachute, said vehicle having a wheeled chassis incorporating an open driving position with a roll bar, and a loading platform, wherein the vehicle is capable of wading in up to 70 cm. depths, wherein in said loading platform are established two longitudinal rows of rollers mounted on corresponding supports, which are retractable and which fit in grooves of the platform, connected to said platform by connecting rods driven by any means allowing to partially raise the supports with the rollers with respect to a general plan of the loading platform, forming wheeled supports for large loads which have a flat base, wherein the loading platform between the rows of rollers incorporates a pair of doors which when closed form part of said loading platform, wherein the doors comprise a bottom surface and are provided on their bottom surface with a padding, so that when the doors are at 180° with respect to a closed position, said doors provide seats which frame an intermediate receptacle which is dimensionally adequate for housing the legs of persons who are sitting on the said padding.

8. Multi-purpose all-terrain vehicle constructed to be air-lifted and dropped by parachute, said vehicle having a wheeled chassis incorporating an open driving position with a roll bar, and a loading platform, wherein the vehicle is capable of wading in up to 70 cm. depths, wherein in said loading platform are established two longitudinal rows of rollers mounted on corresponding supports, which are retractable and which fit in grooves of the platform, connected to said platform by connecting rods driven by any means allowing to partially raise the supports with the rollers with respect to the general plan of the loading platform, forming wheeled supports for large loads which have a flat base, wherein at least one seat, as well as the roll bar, are foldable downwardly, said roll bar being connected by hinge joints to the vehicle chassis, and having tie rods with quick-release attachment mechanisms, further wherein the steering wheel can be removed, such that when the seats and the roll bar are folded and steering wheel removed it becomes possible to pile vehicles on top of each other.

9. Multi-purpose all-terrain vehicle constructed to be air-lifted and dropped by parachute, said vehicle having a wheeled chassis incorporating an open driving position with a roll bar, and a loading platform, wherein the vehicle is capable of wading in up to 70 cm. depths, wherein in said loading platform are established two longitudinal rows of rollers mounted on corresponding supports, which are retractable and which fit in grooves of the platform, connected to said platform by connecting rods driven by any means allowing to partially raise the supports with the rollers with respect to a general plan of the loading platform, forming wheeled supports for large loads which have a flat base, wherein the vehicle incorporates two elongated plates, which are independent and multi-functional, and which may be used to lift heavy loads with the aid of a winch, and which may also be used to increase the useful surface of the loading platform and as side walls for said platform, for which purpose each of said plates is provided on one of its ends with a pair of hooks by which it can be perpendicularly coupled to any of three free edges of the platform with the aid of shaft-like forks provided in housings of the edges, wherein the plates comprise longitudinal edges and on one of the longitudinal edges the plates also incorporate hooks which allow to couple the plates longitudinally or parallel to side edges of the platform, in two inverted position, in one of which the plates tend towards a horizontal position co-planar to the platform because of gravity, and in the other of which they are perpendicular to the platform, which is stabilised with the aid of perimeter straps which run between the two plates, wherein the chassis has a lower rear area, wherein the lower rear area of the chassis is provided with a pair of supports embodied as rectangular frames which may swivel sideways by means of shafts, so that the supports are the means of support of a rear plate which is hinged to the rear edge of the platform and which forms an extension of said platform, and the supports provide the means of support for plates when the plates are in a resting position, for which purpose the said supports have a segment opposite a swivel shaft which can be retracted and locked in position by the aid of a bracket, and the supports can be attached to the lower face of the rear plate when the latter is horizontal, using a fork associated to said plate.

10. Multi-purpose all-terrain vehicle constructed to be air-lifted and dropped by parachute, said vehicle having a wheeled chassis incorporating an open driving position with a roll bar, and a loading platform, wherein the vehicle is capable of wading in up to 70 cm. depths, wherein in said loading platform are established two longitudinal rows of rollers mounted on corresponding supports, which are retractable and which fit in grooves of the platform, connected to said platform by connecting rods driven by any means allowing to partially raise the supports with the rollers with respect to a general plan of the loading platform, forming wheeled supports for large loads which have a flat base, wherein the vehicle incorporates two elongated plates, which are independent and multi-functional, and which may be used to lift heavy loads with the aid of a winch, and which may also be used to increase the useful surface of the loading platform and as side walls for said platform, for which purpose each of said plates is provided on one of its ends with a pair of hooks by which it can be perpendicularly coupled to any of three free edges of the platform with the aid of shaft-like forks provided in housings of the edges, wherein the plates comprise longitudinal edges and on one of the longitudinal edges the plates also incorporate hooks which allow to couple the plates longitudinally or parallel to side edges of the platform, in two inverted position, in one of which the plates tend towards a horizontal position co-planar to the platform because of gravity, and in the other of which they are perpendicular to the platform, which is stabilised with the aid of perimeter straps which run between the two plates, wherein the loading platform between the rows of rollers incorporates a pair of doors which when closed form part of said loading platform, wherein the doors comprise a bottom surface and are provided on their bottom surface with a padding, so that when the doors are at 180° with respect to a closed position, said doors provide seats which frame an intermediate receptacle which is dimensionally adequate for housing the legs of persons who are sitting on the said padding.

11. Multi-purpose all-terrain vehicle constructed to be air-lifted and dropped by parachute, said vehicle having a wheeled chassis incorporating an open driving position with a roll bar, and a loading platform, wherein the vehicle is capable of wading in up to 70 cm. depths, wherein in said loading platform are established two longitudinal rows of rollers mounted on corresponding supports, which are retractable and which fit in grooves of the platform, connected to said platform by connecting rods driven by any means allowing to partially raise the supports with the rollers with respect to the general plan of the loading platform, forming wheeled supports for large loads which have a flat base, wherein the vehicle incorporates two elongated plates, which are independent and multi-functional, and which may be used to lift heavy loads with the aid of a winch, and which may also be used to increase the useful surface of the loading platform and as side walls for said platform, for which purpose each of said plates is provided on one of its ends with a pair of hooks by which it can be perpendicularly coupled to any of three free edges of the platform with the aid of shaft-like forks provided in housings of the edges, wherein the plates comprise longitudinal edges and on one of the longitudinal edges the plates also incorporate hooks which allow to couple the plates longitudinally or parallel to side edges of the platform, in two inverted position, in one of which the plates tend towards a horizontal position co-planar to the platform because of gravity, and in the other of which they are perpendicular to the platform, which is stabilised with the aid of perimeter straps which run between the two plates, wherein at least one seat, as well as the roil bar are foldable downwardly, said roll bar being connected by hinge joints to the vehicle chassis, and having tie rods provided with quick-release attachment mechanisms, further wherein a steering wheel can be removed, such that when the seats and the roll bar are folded and the steering wheel removed it becomes possible to pile vehicles on top of each other.

* * * * *